United States Patent [19]
Smith

[11] Patent Number: 5,660,589
[45] Date of Patent: Aug. 26, 1997

[54] LUBRICANT RETAINING VALVE FOR UNIVERSAL JOINT

[75] Inventor: Johnny N. Smith, Toledo, Ohio

[73] Assignee: Dana Corporation, Toledo, Ohio

[21] Appl. No.: 578,744

[22] Filed: Dec. 26, 1995

[51] Int. Cl.$^6$ .................... F16C 1/24; F16N 1/00
[52] U.S. Cl. .................. 464/14; 464/136; 137/561 A
[58] Field of Search ...................... 464/7, 11, 14, 464/136; 137/561 A

[56] References Cited

U.S. PATENT DOCUMENTS

| | | |
|---|---|---|
| 2,209,855 | 7/1940 | Slaught. |
| 3,353,374 | 11/1967 | Buthenoff. |
| 4,103,512 | 8/1978 | McElwain et al. ............ 464/14 |
| 4,478,591 | 10/1984 | Mangiavacci ............ 464/14 |
| 4,795,401 | 1/1989 | Ende ............ 464/14 |
| 4,936,133 | 6/1990 | Orain ............ 464/7 X |
| 5,073,057 | 12/1991 | Lathrop et al.. |
| 5,188,564 | 2/1993 | Keller. |

FOREIGN PATENT DOCUMENTS 920989  12/1954  Germany .................. 137/561 A

*Primary Examiner*—Daniel P. Stodola
*Assistant Examiner*—Emmanuel M. Marcelo
*Attorney, Agent, or Firm*—MacMillan, Sobanski & Todd

[57] ABSTRACT

A cross member for a universal joint includes a body portion having at least one trunnion extending radially outwardly from the body portion, the trunnion including an outer bearing surface. A bearing cup having an open end and an inner bearing surface is mounted on the trunnion such that the inner bearing surface of the bearing cup is disposed co-axially about the outer bearing surface of the trunnion. A bearing is disposed between the inner bearing surface of the bearing cup and the outer bearing surface of the trunnion to enable rotation of the trunnion relative to the bearing cup. A trunnion bore is positioned within the trunnion and it communicates with the bearing to enable lubricant within the trunnion bore to reach the bearing. A lubrication conduit communicates with the trunnion bore to supply a lubricant to the trunnion bore. A retention valve is positioned within the lubrication conduit for preventing drainback of the lubricant within the lubrication conduit. The retention valve includes a valve body extending along a portion of the length of the conduit, with the valve body having an outer surface approximately the same size as the inner surface of the lubrication conduit. The retention valve also includes a plurality of grooves in the surface of the valve body, with the grooves extending generally in the direction of the length of the conduit, and the grooves being large enough to enable the passage of the lubricant under pressure past the retention valve, but small enough to prevent drainback of lubricant within the lubrication conduit.

17 Claims, 2 Drawing Sheets

LUBRICANT RETAINING VALVE FOR UNIVERSAL JOINT

BACKGROUND OF THE INVENTION

This invention relates in general to universal joints, and in particular to an apparatus for supplying and retaining a lubricant within various rotating parts of universal joints.

Universal joints are well known devices which provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly from the cross. The trunnions are oriented in a single plane and extend at right angles relative to one another, and the trunnions have a common intersection at the center of the central body portion.

A hollow cylindrical bearing cup is mounted on the end of each of the trunnions. Needle beatings or similar means are provided between the outer cylindrical surfaces of the trunnions and the inner cylindrical surfaces of the bearing cups to permit relative rotational movement between the trunnions and the beating cups. The bearing cups which are mounted on an opposed pair of the trunnions can be connected to a first end yoke secured to an end of a first drive shaft section, while the bearing cups mounted on a second opposed pair of the trunnions can be connected to a second end yoke secured to an end of a second drive shaft section.

The bearings between the bearing cups and the trunnions require lubrication. Universal joint trunnions often are hollowed out with central bores adapted for supplying a lubricant to the beatings. The central bores of each of the four trunnions can be joined, at their common intersection, with a lubrication bore or conduit which supplies lubricant to the four central bores from a single fitting. Under this arrangement, each of the central bores is in direct communication with each other. This facilitates the lubrication process. Upon rotation of the universal joint, the centrifugal force of rotation ensures that a sufficient quantity of lubricant flows along the trunnion central bores toward the bearings. When the universal joint is not rotating, such as when the vehicle is at rest, the centrifugal force is not present, and the lubricant can flow by gravity from the central bore of an upwardly oriented trunnion down into the central bores of the other trunnions. This problem generally occurs during warm weather, when the lubricant is apt to flow more readily. When the vehicle is then started, the universal joint will temporarily be without lubricant at the one affected bearing, until the centrifugal force of rotation can replenish the supply of lubricant to the bearing. Operating the universal joint without adequate lubricant, even for a short time, causes undue wear on the mechanism.

It is known to position check valves inside the central bores of the trunnions to prevent the lubricant from flowing backward (away from the bearings) when the universal joint is not rotating. The use of check valves in each of the central bores is generally satisfactory for maintaining lubricant in the bearings. However, positioning check valves within the central bores of the trunnions complicates the insertion of lubricant into the trunnion central bores. Ideally, the central bores would be filled with lubricant, or prelubricated, before shipping to the location where the universal joint is assembled. When check valves are used in each of the trunnion central bores, however, the lubricant can be deposited within the central bores only after the check valves are in place. This precludes prelubrication prior to shipping.

Accordingly, it would be desirable to provide a lubrication system for a universal joint where there are no check valves in the trunnion central bores so that they can be lubricated prior to shipping. Also, it is desirable for such a lubrication system to be able to prevent the drainback of lubricant while the universal joint is not rotating.

SUMMARY OF THE INVENTION

There has now been developed a system of lubrication for universal joints which lubricates the bearings during rotation and prevents drainback when the universal joint is not rotating. A retention valve is used to enable the passage of the lubricant under pressure, while preventing drainback of the lubricant during the time the universal joint is not rotating.

The cross member for the universal joint of the invention includes a body portion having at least one trunnion extending radially outwardly from the body portion, and a bearing mounted on the trunnion such that the inner bearing surface of the bearing cup is disposed co-axially about the outer bearing surface of the trunnion. A bearing is disposed between the inner bearing surface of the bearing cup and the outer bearing surface of the trunnion to enable rotation of the trunnion relative to the bearing cup.

A trunnion bore positioned within the trunnion communicates with the bearing to enable lubricant within the trunnion bore to reach the beating. A lubrication conduit supplies a lubricant to the trunnion bore, and a retention valve positioned within the lubrication conduit prevents drainback of the lubricant within the lubrication conduit. The retention valve includes a valve body extending along a portion of the length of the conduit and a plurality of grooves in the valve body. The valve body has an outer surface approximately the same size as the inner surface of the lubrication conduit, and the grooves extend generally in the direction of the length of the conduit. The grooves are large enough to enable the passage of the lubricant under pressure past the retention valve, but small enough to prevent drainback of lubricant within the lubrication conduit.

By positioning the retention valve within the lubrication conduit, the drainback of lubricant is prevented. The lubrication system of the invention enables the trunnion central bores to be lubricated prior to shipping since there are no check valves in the trunnion central bores. The grooves on the valve body surface, and the lands between the grooves, prevent the flow of lubricant from the central bore of one trunnion to the central bore of another while the universal joint is at rest.

In a preferred embodiment of the invention, four trunnions extend radially outwardly from the body portion, with the four trunnions meeting at an intersection. The retention valve is positioned within the intersection and substantially fills the intersection so that the trunnion bores are not in direct communication with each other.

In another embodiment of the invention, the grooves have a generally semi-circular cross-section, and when viewed in the cross-section, the grooves have an area within the range of from about 0.25 to about 6.0 $mm^2$.

In yet another embodiment of the invention, the retention valve has a portion of reduced cross-sectional area at either one end or both ends to facilitate insertion into the lubrication conduit.

DETAILED DESCRIPTION OF THE PREFERRED EMBODIMENT

Figure 1:
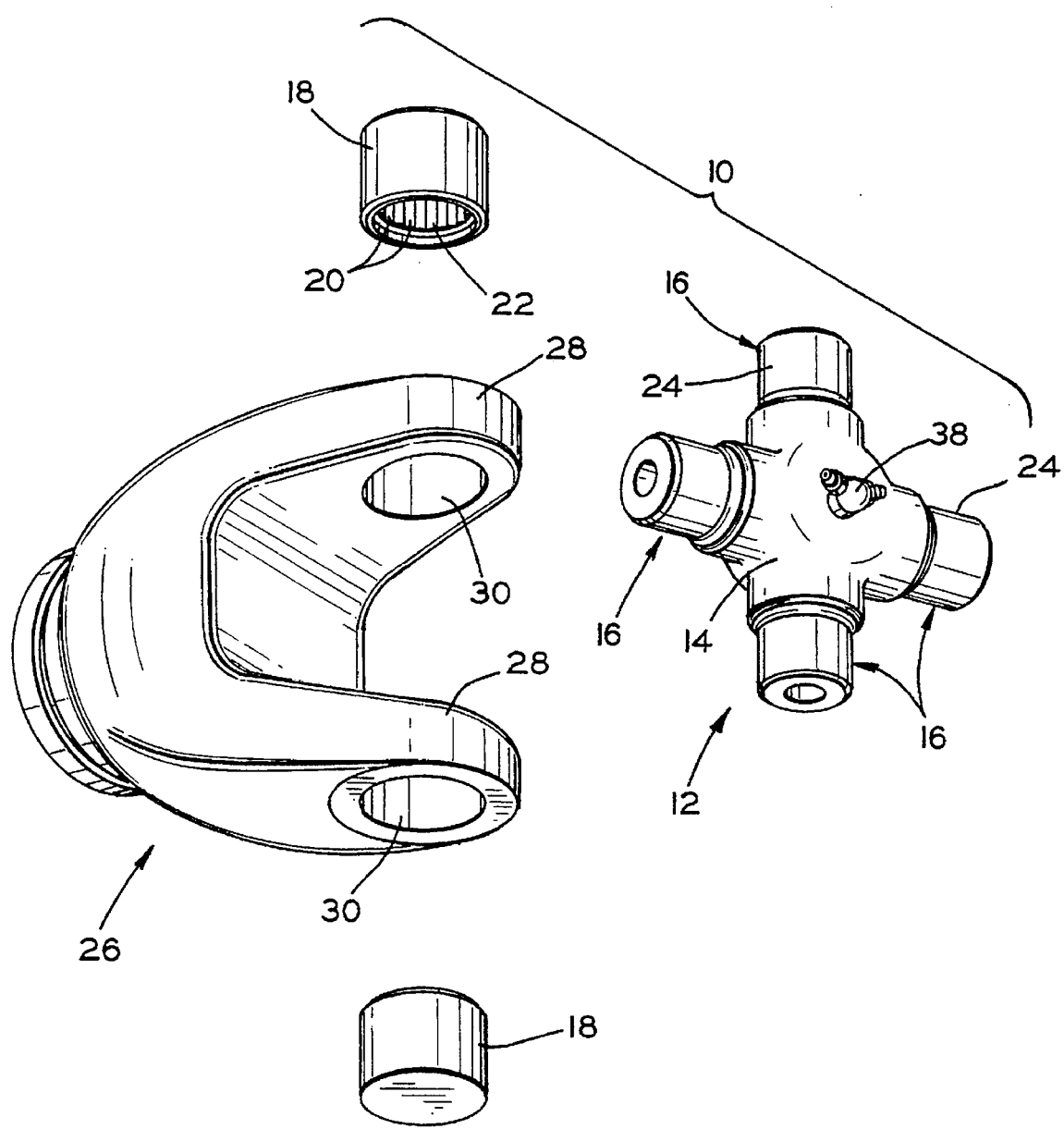
FIG. 1 is an exploded view in perspective of a universal joint including a yoke and a cross with beating cups.

Referring now to the drawings, there is illustrated in FIG. 1 a universal joint, indicated generally at 10. The universal joint 10 includes a cross member, indicated generally at 12. The cross 12 includes a central body portion 14. The cross member further includes four cylindrical trunnions 16. The trunnions extend radially outwardly from the body portion 14 in a common plane at right angles relative to one another. Bearing cups 18 are mounted on the end of each of a pair of opposed trunnions. Needle beatings 20 are disposed between the inner bearing surface 22 of the bearing cups and the outer bearing surface 24 of the trunnions. It is to be understood that any suitable bearing can be used to provide a reduced friction rotational connection between the bearing cup and the trunnions. Each of the bearing cups is formed generally in the shape of a hollow cylinder.

The universal joint 10 illustrated in FIG. 1 further includes a full round end yoke, indicated generally at 26. The end yoke includes a pair of opposed arms 28, each of which has a cylindrical opening 30 for receiving a bearing cup 18. When the cross member 12 is assembled with the end yoke 26, the opposed bearing cups 18 are received in the openings 30. The complete universal joint includes another yoke, not shown, which cooperates with the yoke 26 to transfer torque. The design and assembly of universal joints thus far described are well known to those skilled in the art.

Figure 2:
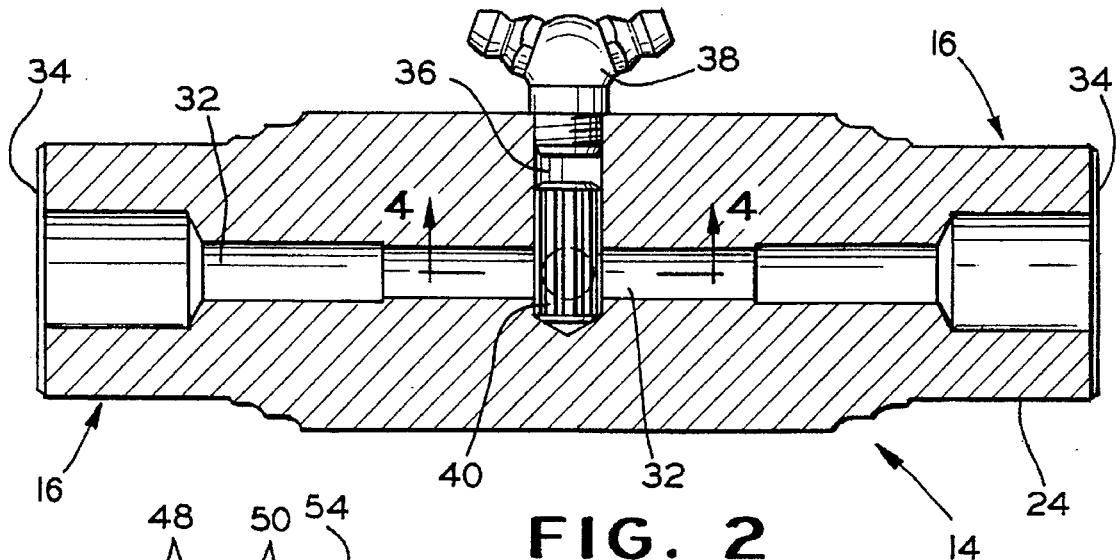
FIG. 2 is a plan view in cross-section of the cross of the universal joint of FIG. 1, including the lubrication conduit and two trunnions.

As shown in FIG. 2, each trunnion 16 is adapted with a central bore 32 which extends along the length of the trunnion. The central bores provide a passage for the flow of lubricant to the ends 34 of the trunnions. The central bores can be of any shape or configuration for delivering lubricant to the bearings, and are adapted to act as a reservoir for the lubricant. When the universal joint 10 is rotating, the centrifugal force of the rotation will urge the lubricant outwardly toward the ends 34 of the trunnions. Since the beatings 20 (not shown in FIG. 2) are positioned at the ends of the trunnions, the radially outward flow of lubricant ensures that the bearings will be protected by the lubricant.

The lubrication conduit 36 extends from outside the cross body 14 to the interior of the cross body to provide a passageway for lubricants to supplied to the trunnion central bores 32. Although the lubrication conduit 36 is shown as being cylindrical in shape, it can be of any suitable shape or construction as long as lubricant can be supplied to the interior of the trunnions. A fitting, such as double zerk fitting 38, is provided to emit the lubricant into the lubrication conduit. Typically, such fittings are provided with internal one-way ball valves.

Figure 3:
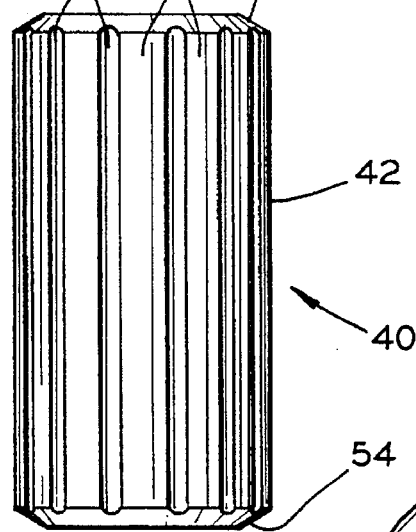
FIG. 3 is a view in elevation of the retention valve of the invention.

Positioned within the lubrication conduit 36 is the retention valve 40, which controls the flow of lubricant through the lubrication conduit. As shown in FIG. 3, the retention valve 49 includes valve body 42 which extends along a portion of the length of the lubrication conduit 36. As more clearly seen in FIG. 4, the valve body has an outer surface 44 which is approximately the same size as the inner surface 46 of the lubrication conduit. In the preferred embodiment of the invention, the lubrication conduit and valve body are both cylindrical and have approximately the same diameter. It is important to have a close tolerance between the two surfaces 44 and 46 to prevent the flow of lubricant along the surface. The retention valve can be made of any suitable material. Preferably it is comprised of injection molded plastic.

The valve body 42 is provided with a plurality of grooves 48 which extend generally in the direction of the length of the lubrication conduit, and are preferably generally parallel to each other. The grooves control the flow of lubricant past the retention valve. The grooves are large enough to enable the passage of lubricant under pressure past the retention valve, and yet small enough to avoid the backwards flow or drainback of the lubricant through or past the retention valve. It can be seen in FIGS. 3 and 4 that the grooves 48 are circumferentially spaced apart from each other, thereby defining lands 50 on the valve body outer surface 44.

Figure 4:
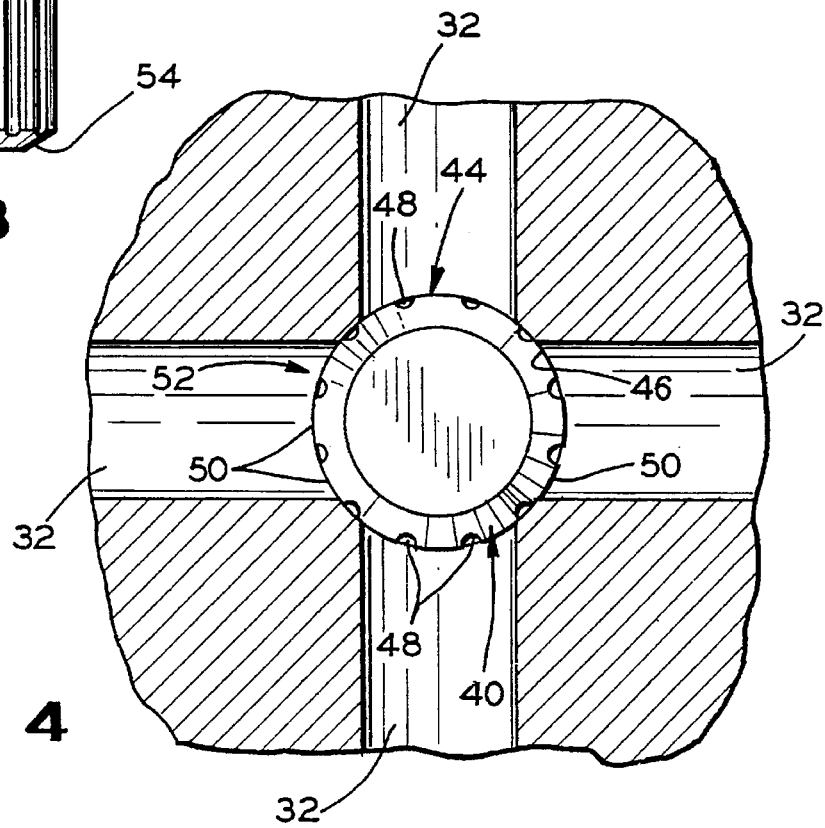
FIG. 4 is a cross-sectional view in elevation of the four trunnions meeting at the retention valve, taken along line 4—4 of FIG. 2.

Typical pressures for the application of lubricants is on the order of about 100 pounds per square inch or greater. The pressure of the lubricant within the trunnion central bores 32 is near atmospheric pressure, and the small size of the grooves 48 prevents drainback of the lubricant under such relatively low pressure. The size of the grooves is a function of the length of the retention valve and the flow characteristics of the lubricant. For a typical lubricant, the grooves are preferably sized to have a cross-sectional area within the range of from about 0.25 to about 6.0 mm$^2$. As shown in FIG. 4, the grooves can have a nearly semi-circular cross-sectional shape, although other shapes can also be employed. In a preferred embodiment of the invention, the grooves have a radius of about 0.6 mm and extend to a depth of about 0.6 mm below the valve body outer surface 44.

As shown in FIG. 4, the grooves 48 are spaced circumferentially around the retention valve outer surface 44. Preferably there are at least 8 grooves, although the number of grooves depends on the size of the universal joint and the flow characteristics of the lubricant. A critical aspect of the grooves is that each central bore 32 is lined up with or in communication with at least one of the grooves. This is required to ensure that each central bore can be filled with lubricant via the lubrication conduit 36. Preferably, each bore is in communication with at least two of the grooves. If there are enough grooves, then the requirement to circumferentially orient the retention valve to ensure alignment of at least one groove with each trunnion central bore is eliminated.

It can be seen from FIG. 4 that all four of the central bores 32 meet at a common point or intersection 52. It is important that at least one land 50 be positioned to block any possible flow of lubricant from one central bore 32 to another. Otherwise, when the universal joint is not rotating, the lubricant from the central bore of an upwardly extending trunnion could flow by gravity past the retention valve and into the central bore one of one of the other trunnions. The lands 50 extend parallel to the length of the lubrication conduit 36 and generally perpendicular to the trunnion central bores 32 to prohibit communication between different central bores. This prevents the undesirable drainage or drainback of the lubricant from the upwardly oriented trunnion.

As shown in FIG. 3, the retention valve 40 has tapered ends 54 to facilitate the insertion of the retention valve into the lubrication conduit 36. This portion of reduced cross-sectional area can be positioned at either one end or both ends to facilitate insertion into the lubrication conduit.

In operation, the cross member 12 contains four trunnions 16, each having central bores 32. The lubrication conduit 36 supplies lubricant under pressure, which flows through the grooves 48 into the central bores 32. The grooves are sized to enable lubricant to flow under pressure, but to prevent backflow under atmospheric pressure. The lands 50 on the valve body outer surface 44 prevent the lubricant in one trunnion 16 from flowing back into the lubrication conduit 36 or into the central bores of the other trunnions.

It will be evident from the foregoing that various modifications can be made to this invention. Such, however are considered as being within the scope of the invention.

What is claimed is:

1. A cross member for a universal joint comprising:

a body portion having a lubrication conduit formed therein which defines an inner surface;

a trunnion extending from said body portion, said trunnion having a bore formed therein which extends from said conduit of said body portion; and a valve disposed within said conduit, said valve including a valve body having an outer surface which engages said inner surface of said conduit and a plurality of longitudinal grooves formed in said outer surface of the body, said grooves being sized to permit the flow of lubricant under pressure from said conduit of said body portion to said bore of said trunnion and to normally prevent the flow of lubricant from said bore of said trunnion to said conduit of said body portion.

2. The cross member defined in claim 1 wherein said lubrication conduit is a cylindrical bore formed in said body portion, and wherein said outer surface of said valve body is cylindrical in shape.

3. The cross member defined in claim 1 wherein each of said grooves has a generally semi-circular cross-section.

4. The cross member defined in claim 1 wherein each of said grooves, when viewed in the cross-section, has an area within the range of from about 0.25 mm$^2$ to about 6.00 mm$^2$.

5. The cross member defined in claim 1 wherein said valve body includes a tapered end.

6. The cross member defined in claim 1 wherein said valve body includes a pair of tapered ends.

7. The cross member defined in claim 1 wherein a plurality of trunnions extend from said body portion, each of said trunnions having a bore formed therein which extends from said conduit of said body portion, and wherein said grooves are sized to permit the flow of lubricant under pressure from said conduit of said body portion to one of said bores of said trunnions and to normally prevent the flow of lubricant from said one of said bores of said trunnions to said conduit of said body portion.

8. The cross member defined in claim 1 wherein said grooves extend generally parallel to one another.

9. The cross member defined in claim 1 wherein a plurality of trunnions extend from said body portion, each of said trunnions having a bore formed therein which extends from said conduit of said body portion, and wherein said grooves are sized to permit the flow of lubricant under pressure from said conduit of said body portion to said bores of said trunnions and to normally prevent the flow of lubricant from said bores of said trunnions to said conduit of said body portion.

10. A universal joint comprising:

a first yoke;

a second yoke;

a cross member including a body portion having a lubrication conduit formed therein which defines an inner surface, first and second pairs of trunnions extending from said body portion, each of said trunnions having a bore formed therein which extends from said conduit of said body portion, and a valve disposed within said conduit, said valve including a valve body having an outer surface which engages said inner surface of said conduit and a plurality of longitudinal grooves formed in said outer surface of the body, said grooves being sized to permit the flow of lubricant under pressure from said conduit of said body portion to one of said bores of said trunnions and to normally prevent the flow of lubricant from said one of said bores of said trunnions to said conduit of said body portion;

a first pair of bearing cups rotatably supported on said first pair of trunnions and connected to said first yoke; and a second pair of bearing cups rotatably supported on said second pair of trunnions and connected to said second yoke.

11. The universal joint defined in claim 10 wherein said lubrication conduit is a cylindrical bore formed in said body portion, and wherein said outer surface of said valve body is cylindrical in shape.

12. The universal joint defined in claim 10 wherein each of said grooves has a generally semi-circular cross-section.

13. The universal joint defined in claim 10 wherein each of said grooves, when viewed in the cross-section, has an area within the range of from about 0.25 mm$^2$ to about 6.00 mm$^2$.

14. The universal joint defined in claim 10 wherein said valve body includes a tapered end.

15. The universal joint defined in claim 10 wherein said valve body includes a pair of tapered ends.

16. The universal joint defined in claim 10 wherein said grooves extend generally parallel to one another.

17. The universal joint defined in claim 10 wherein said grooves are sized to permit the flow of lubricant under pressure from said conduit of said body portion to each of said bores of said trunnions and to normally prevent the flow of lubricant from each of said bores of said trunnions to said conduit of said body portion.

* * * * *